United States Patent Office 2,767,193
Patented Oct. 16, 1956

2,767,193

5,5-DISUBSTITUTED 3-AMINOHYDANTOINS

William Taub, Rehovoth, Israel, assignor to J. R. Geigy A. G., Basel, Switzerland, a Swiss firm No Drawing. Application February 14, 1955, Serial No. 488,141

Claims priority, application Israel February 16, 1954

7 Claims. (Cl. 260—309.5)

This invention relates to new pharmacologically active compounds, namely 5.5-disubstituted 3-aminohydantoins of the general formula:

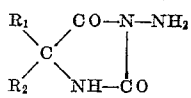

in which $R_1$ and $R_2$ stand for the same or different hydrocarbon radicals.

In particular, it has been found that these compounds have a pronounced diuretic effect.

The new compounds can be prepared for example by heating in an aqueous suspension or solution a dihydrazide of the general formula:

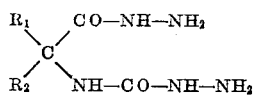

wherein $R_1$ and $R_2$ have the meanings given above.

In this process, a large part of the water can gradually be distilled off to enable the liberated hydrazine to be continually removed. The dihydrazides necessary are obtained, for example by heating diesters of C.C-disubstituted glycine-N-carboxylic acids with excess hydrazine in alcoholic solution.

In another mode of performing the process, esters of monohydrazides of C.C-disubstituted glycine-N-carboxylic acids are heated until the hydroxy compound present in ester linkage is completely split off. The monohydrazide esters of C.C-disubstituted glycine-N-carboxylic acids which serve as starting materials for these two processes are obtained, e. g. by reacting the corresponding diesters with hydrazine in alcoholic solution at room temperature or at a moderately raised temperature.

The diesters of C.C-disubstituted glycine-N-carboxylic acids already mentioned as starting materials for the dihydrazides used for ring closure can be obtained for example by reactions known per se from ketones of the general formula: $R_1$—CO—$R_2$, so that ketones which are easily accessible are the basic materials for many of the disubstituted 3-aminohydantoins according to the present invention. Such ketones can, for example, first be converted into the nitriles of C.C-disubstituted glycines and these then converted into the corresponding esters. On reacting these esters with chloroformic acid esters, the desired diesters of C.C-disubstituted glycine-N-carboxylic acid are produced. Esters of C.C-disubstituted glycines can also be obtained by methods known per se (see, for example Org. Synth. 20, 42) by converting ketones into the corresponding hydantoins, splitting these and then esterifying the amino acids obtained.

In the production of the direct starting materials for such 5.5-disubstituted 3-aminohydantoins which do not correspond to easily obtainable ketones $R_1$—CO—$R_2$, the Hofmann degradation of C.C-disubstituted cyanacetamides according to Errera yielding disubstituted hydantoins by ring closure is a further possible reaction which offers numerous variations with regard to the radicals $R_1$ and $R_2$. Other possible ways of producing the starting materials can be found from other syntheses described in the literature for the production of α-amino acids.

The following examples serve to illustrate the invention further without limiting it in any way. Parts are given as parts by weight. Where not otherwise mentioned, the relationship of parts by weight to parts by volume is as that of grammes to cubic centimetres. The temperatures are in degrees centigrade.

Example 1

A solution of 20.3 parts of N-carbethoxy-α-aminoisobutyric acid ethyl ester and 50 parts of hydrazine hydrate in 200 parts by volume of absolute ethanol is refluxed for 20 hours. The alcohol is evaporated, the residue is dissolved in 500 parts of distilled water, and the solution is concentrated by evaporation under ordinary pressure until the volume is reduced to about 50 parts by volume. Upon cooling, 5.5-dimethyl-3-aminohydantoin crystallises in colourless crystals. After recrystallisation from water, this compound melts at 184°.

Example 2

A solution of 24.5 parts of N-carbethoxy-α-amino-α-isobutyl propionic acid ethyl ester (B. P.$_{20 mm.}$ 150–153°) and 50 parts of hydrazine hydrate in 200 parts by volume of absolute alcohol is refluxed for 20 hours. Then the alcohol is evaporated, the residue is dissolved in 500 parts of distilled water, and the solution is concentrated by evaporation under ordinary pressure until the volume is reduced to about 50 parts by volume. Upon cooling, 5-methyl-5-isobutyl-3-aminohydantoin crystallises in colourless crystals. After recrystallisation from diluted methanol this compound melts at 171°.

Example 3

A solution of 23.1 parts of N-carbethoxy-α-amino-α-ethyl butyric acid ethyl ester (B. P.$_{21 mm.}$ 138–140°) and 50 parts of hydrazine hydrate in 200 parts by volume of absolute ethanol is refluxed for 30 hours. Then the alcohol is evaporated, the residue is suspended in 500 parts of distilled water and the solution is concentrated by evaporation under ordinary pressure until the volume is reduced to about 50 parts by volume. Upon cooling, 5.5-diethyl-3-aminohydantoin crystallises in colourless crystals. Upon recrystallisation from diluted ethanol this compound melts at 178–180°.

Example 4

A solution of 25.9 parts of N-carbethoxy-α-amino-α-butyl butyric acid ethyl ester (B. P.$_{20 mm.}$ 160–162°) and 50 parts of hydrazine hydrate in 200 parts by volume of absolute ethanol is refluxed for 20 hours. Then the alcohol is evaporated, the residue is suspended in 500 parts of distilled water and the solution is concentrated by evaporation under ordinary pressure until the volume is reduced to about 70 parts by volume. Upon cooling, 5-ethyl-5-n-butyl-3-aminohydantoin crystallises in colourless crystals which, upon recrystallisation from water, melt at 143–144°.

Example 5

A solution of 27.3 parts of N-carbethoxy-α-n-hexyl-α-amino-propionic acid ethyl ester (B. P.$_{22 mm.}$ 180–181°) and 65 parts of hydrazine hydrate in 175 parts by volume of absolute methanol is refluxed for 30 hours. Then the solvent is evaporated, the residue is suspended in 750 parts of distilled water, and the solution is concentrated by evaporation under atmospheric pressure until the volume is reduced to about 55 parts by volume. Upon cooling, 5-methyl-5-n-hexyl-3-aminohydantoin crystallises in colourless crystals. Upon recrystallisation from ethanol, the new compound melts at 136°.

*Example 6*

A solution of 23.9 parts of N-carbomethoxy-α-amino-α-benzyl propionic acid methyl ester (M. P. 45°) or 26.7 parts of N-carbethoxy-α-amino-α-benzyl propionic acid ethyl ester and 60 parts of hydrazine hydrate in 200 parts by volume of absolute ethanol are boiled under reflux for 30 hours. After evaporating the solvent, the residue is suspended in 1000 parts by volume of water and the volume is reduced to about 80 parts by volume by evaporating off the water under normal pressure. After cooling, the precipitated 5-methyl-5-benzyl-3-aminohydantoin is filtered off and recrystallised from ethanol.

The following compounds can be prepared in an analogous manner:

|  | M. P., degrees |
|---|---|
| 5-methyl-5-ethyl-3-aminohydantoin | 157 |
| 5-methyl-5-n-propyl-3-aminohydantoin | 137 |
| 5-ethyl-5-n-amyl-3-aminohydantoin | 140 |
| 5-methyl-5-cyclopropyl-3-aminohydantoin | 160 |
| 5-methyl-5-phenyl-3-aminohydantoin | 166 |
| 5-ethyl-5-phenyl-3-aminohydantoin | 146 |
| 5,5-diphenyl-3-aminohydantoin | 188 |

5-methyl-5-allyl-3-aminohydantoin.
5-ethyl-5-cyclohexenyl-3-aminohydantoin.

What I claim is:

1. A therapeutically active compound corresponding to the formula:

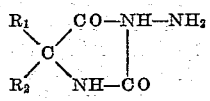

wherein $R_1$ represents a hydrocarbon radical with at most 7 carbon atoms, and $R_2$ represents a lower alkyl radical.

2. A therapeutically active compound corresponding to the formula:

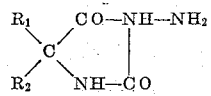

wherein $R_1$ and $R_2$ each represents a lower alkyl radical.

3. A therapeutically active compound corresponding to the formula:

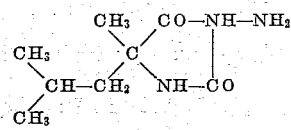

4. A therapeutically active compound corresponding to the formula:

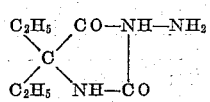

5. A therapeutically active compound corresponding to the formula:

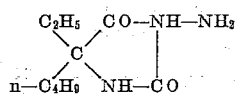

6. A therapeutically active compound corresponding to the formula:

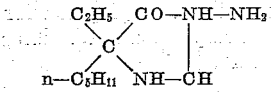

7. A therapeutically active compound corresponding to the formula:

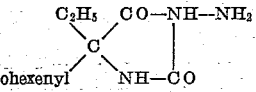

No references cited.